United States Patent
Levine et al.

(10) Patent No.: US 7,984,059 B2
(45) Date of Patent: Jul. 19, 2011

(54) METHOD AND SYSTEM FOR TRANSFERRING DATA BETWEEN MIME ATTACHMENTS AND RELATIONAL DATABASES

(75) Inventors: Jason Levine, Derwood, MD (US);
Kalpesh Shah, Herndon, VA (US);
Barry Dresdner, Herndon, VA (US)

(73) Assignee: Software AG, Darmstadt (DE)

( * ) Notice: Subject to any disclaimer, the term of this patent is extended or adjusted under 35 U.S.C. 154(b) by 255 days.

(21) Appl. No.: 11/436,098

(22) Filed: May 17, 2006

(65) Prior Publication Data

US 2007/0271251 A1 Nov. 22, 2007

(51) Int. Cl.
*G06F 7/00* (2006.01)
(52) U.S. Cl. ......... 707/760; 707/756; 707/758; 709/201
(58) Field of Classification Search .................. 707/760, 707/756, 758; 709/201
See application file for complete search history.

(56) References Cited

U.S. PATENT DOCUMENTS

| | | | |
|---|---|---|---|
| 6,678,705 B1* | 1/2004 | Berchtold et al. | 707/204 |
| 6,816,885 B1 | 11/2004 | Raghunandan | |
| 6,882,996 B2 | 4/2005 | Preisig et al. | |
| 7,152,090 B2* | 12/2006 | Amirisetty et al. | 709/200 |
| 2002/0046248 A1 | 4/2002 | Drexler | |
| 2002/0065892 A1 | 5/2002 | Malik | |
| 2003/0018832 A1 | 1/2003 | Amirisetty et al. | |
| 2004/0107250 A1* | 6/2004 | Marciano | 709/204 |
| 2004/0162827 A1* | 8/2004 | Nakano | 707/6 |
| 2005/0228824 A1* | 10/2005 | Gattuso et al. | 707/104.1 |
| 2005/0234843 A1 | 10/2005 | Beckius et al. | |
| 2007/0022078 A1* | 1/2007 | Gupta et al. | 706/59 |
| 2007/0118601 A1* | 5/2007 | Pacheco | 709/206 |

OTHER PUBLICATIONS

European search report for application No. EP 07 00 9943, mailed Sep. 26, 2007.
E. F. Codd; "A Relational Model of Data for Large Shared Data Banks"; Nov. 1995; reprinted from Communications of the ACM, vol. 13, No. 6, Jun. 1979, pp. 377-387, copyright 1970, Association for Computing Machinery; 20 pages; retrieved from the Internet: http://www.acm.org/classics/nov95/toc.html.
Retrieved from the Internet: http://msdn2.microsoft.com/en-us/library/ms187993.aspx; 2005; two pages.
RFC 959 (RFC959); retrieved from the Internet: http://www.faqs.org/rfcs/rfc959.html; Oct. 1985; 54 pages.
RFC 2616 (RFC2616); retrieved from the Internet: http://www.faqs.org/rfcs/rfc2616.html; Jun. 1999; 131 pages.
"Multipurpose Internet Mail Extensions (MIME) Part One: Format of Internet Message Bodies"; retrieved from the Internet: http://www.ietf.org/rfc/rfc2045.txt; Nov. 1996; 28 pages.
Retrieved from the Internet: http://www.w3.org/TR/soap; May 8, 2000; 2 pages.
Retrieved from the Internet: http://www.mysql.com; copyright 1995-2007; one page.

(Continued)

*Primary Examiner* — don wong
*Assistant Examiner* — Tuan-Khanh Phan
(74) *Attorney, Agent, or Firm* — Meyertons Hood Kivlin Kowert & Goetzel, P.C.; Jeffrey C. Hood

(57) ABSTRACT

A method and a system for the transfer of data contained in an electronic message, in particular a MIME attachment, to a relational database comprising the steps of
providing an XML sequence, which determines, how the data is to be processed,
executing a sequencer, which takes the message and the XML sequence as input, wherein the executing of the sequence comprises the execution of at least one SQL statement for accessing the relational database.

6 Claims, 4 Drawing Sheets

OTHER PUBLICATIONS

Figure 1A:
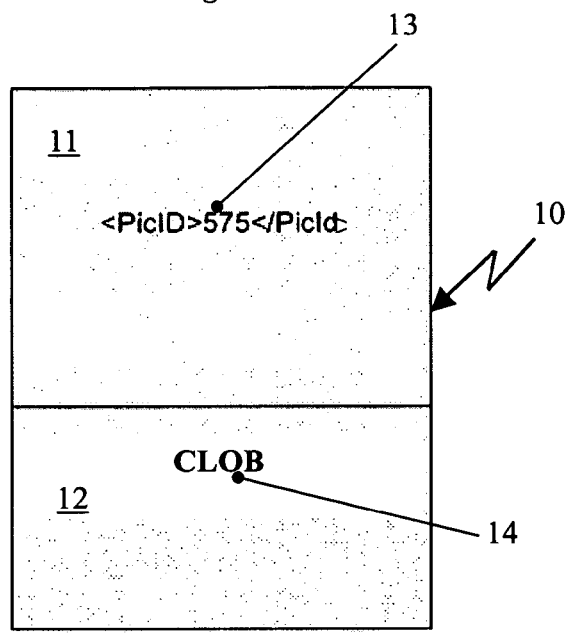

Retrieved from the Internet: http://www.306.ibm.com/software/data/db2; one page.

Retrieved from the Internet: http://java.sun.com/products/jms/index.jsp; 2 pages.

* cited by examiner

Fig. 3

```xml
<?xml version="1.0" encoding="UTF-8"?>
<sequence >
    <block>
        <!--{Name: Connect};{Notes: Connect to the database.}-->
        <step component="SagJdbcConnection" on_error="../Common/
DBConnectionFailureSeq.xml" xbd.jdbc.connection.action="connect"
xbd.jdbc.connection.name="Apache Derby network server connection"
xbd.jdbc.connection.template.url="../SampleConnectionTemplate.xml"
xbd.jdbc.error.continue="no" />

<!--{Name: Ins CLOB};{Notes: Insert a row into the database.}-->
        <step component="SagJdbcStatement" xbd.current.contentID="NewDoc"
xbd.jdbc.connection.name="Apache Derby network server connection"
xbd.jdbc.connection.template.url="../SampleConnectionTemplate.xml"
xbd.jdbc.error.continue="no" xbd.jdbc.statement.action="execute"
xbd.jdbc.statement.cursor="false"
xbd.jdbc.statement.template.url="Ex_05_ClobTemplate.xml" />

<!--{Name: Disconnect};{Notes: Disconnect from the database.}-->
        <step component="SagJdbcConnection"
xbd.jdbc.connection.action="close" xbd.jdbc.connection.name="Apache Derby
network server connection" xbd.jdbc.connection.template.url="../
SampleConnectionTemplate.xml" xbd.jdbc.error.continue="no"/>
    </block>
</sequence>
```

51 — Connect block
52 — Ins CLOB block
53 — Disconnect block

Fig. 4

```xml
<SQLStatementTemplate>
    <SQLStatement>INSERT  INTO documents VALUES (?, ?)</SQLStatement>
    <parameterVector>
        <parameter dest="IN" number="1" required="true" testValue="">
            <type>INTEGER</type>
            <typeCode>4</typeCode>
            <property>DocID</property>
        </parameter>
        <parameter dest="IN" number="2" required="true" testValue="">
            <type>CLOB</type>
            <typeCode>2005</typeCode>
            <cid>NewDoc:application/text</cid>
        </parameter>
    </parameterVector>
    <resultVector rootName="root" rowName="row" type="simple"/>
</SQLStatementTemplate>
```

61 — parameter 1 block
62 — parameter 2 block

METHOD AND SYSTEM FOR TRANSFERRING DATA BETWEEN MIME ATTACHMENTS AND RELATIONAL DATABASES

1. TECHNICAL FIELD

The present invention relates to a method and a system for transferring data contained in an electronic message, in particular in a MIME attachment, to a relational database.

2. THE PRIOR ART

Relational databases such as MYSQL (cf. http://www.myqsl.com/) or DB2 (http://www-306.ibm.com/software/data/db2/) are used commonly to store large amounts of data. Many organizations worldwide store critical data in relational databases. Relational database data is retrieved or updated using Structured Query Language (SQL, cf. "A Relational Model of Data for Large Shared Data Banks" E.F. Codd) commands. Relational databases consist of one or more tables where each table has one or more columns. Database table columns are most commonly simple data types such as character strings or numbers.

Relational databases have evolved to be able to contain more complex, non-structured data such as sound files, digital images or word processing documents. These new types of data are very large. Depending on the vendor, these columns can be up to 4 GB in size, or more. These are known as large objects (LOB). There are two types of large objects: Character Large Object (CLOB) and Binary Large Object (BLOB). Database columns containing LOB data are accessed like any other table column using SQL commands. Various databases use different terms for character and binary large object types. In Microsoft SQL Server (cf. http://msdn2.microsoft.com/en-us/library/ms187993.aspx), for example, TEXT columns are used to store variable length character data and IMAGE columns are used to store variable length binary data.

Businesses and organizations make relational databases available on the internet or intranet to support initiatives such as electronic commerce. It is common for input to or output from internet or intranet accessible databases to be exchanged in messages such as e-mail messages or files that are delivered using the file transfer protocol (FTP, cf. http://www.faqs.org/rfcs/rfc959.html) or hypertext transfer protocol (HTTP, cf. http://www.faqs.org/rfcs/rfc2616.html).

Messages can have a complex structure consisting of a message body and one or more body parts known as attachments. Messages and attachments are for example known as Multipurpose Internet Mail Extensions (RFC 2045, cf. http://www.ietf.org/rfc/rfc2045.txt). While RFC 2045 originally described the structure of e-mail messages it has also been applied to other types of messages such as Simple Object Access Protocol (SOAP, cf http://www.w3.org/TR/soap/) messages or Java Message Service (JMS, cf. http://iava.sun.com/products/jms/index.jsp) messages.

Message attachments can contain not only simple data types such as strings or numbers but also complex data such as JPEG or MP3 files or very large text files. Increasingly, organizations wish to store data such as JPEG files, MP3 files or large text files in relational databases. Conversely, organizations also wish to create messages with attachments containing such files stored in the database.

Prior systems for exchanging data between messages and relational databases do not provide a flexible and simple mechanism for transferring data between message attachments and relational database tables with CLOB or BLOB columns. Exchanging data between message attachments and relational databases requires coding of complex computer programs in the Java, C or other programming languages. Such programs are difficult to write and to change as databases and business requirements change.

The present invention is therefore based on the problem to provide a method and a system allowing a more flexible control of the data transfer between messages, in particular messages with MIME attachments, and relational databases.

3. SUMMARY OF THE INVENTION

According to one aspect of the invention, this problem is solved by a method for the transfer of data contained in an electronic message, in particular in a MIME attachment, to a relational database comprising the steps of providing an XML sequence, which determines, how the data is to be processed, executing a sequencer, which takes the message and the XML sequence as input, wherein the executing of the sequence comprises the execution of at least one SQL statement for accessing the relational database.

Accordingly, rather than using the fixed instructions of a custom code for processing the message so that the desired database access is performed, one embodiment of the present invention uses two different elements: The essentially static sequencer, which is an executable component and the sequence, which is a XML file, the entries of which determine how a message is processed by the sequencer to transfer data contained in the message to a relational database. Changing the entries of the XML sequence therefore allows modifying the processing performed by the sequencer and thereby the way the data contained in the message is transferred to or from the relational database. Since the overall process does not need to be fully coded and compiled again, such an adaptation can be easily performed in a short amount of time.

Preferably, the method further comprises loading of at least one SQL template, which is processed by the sequencer to provide the executable SQL statement. Using an SQL template is, however, not compulsory for the present invention. For example, the sequence may already contain one or more fully qualified SQL statements, which can be executed to access the data base. However, the use of templates, which are loaded by the sequencer in response to corresponding XML statements in the sequence, provides more structured and shorter sequences, which are easier to design and to understand. SQL templates may be used if the SQL statement has parameters.

In a preferred embodiment, the SQL template comprises at least one parameter, the value of which is determined by the processing of the message. Accordingly, the sequencer uses preferably the data derived from the message as parameter values for the SQL statement loaded from the template. Parameter data can be extracted from the message body or from an attachment. For example, a SQL template might have two parameters, wherein the value of a first parameter is determined by data in a message body and wherein the value of a second parameter is determined by data in a message attachment.

The execution of the at least one SQL statement provides in some embodiments output data which are stored as data in an output message, wherein the output data comprise preferably also a first and a second parameter, wherein the value of the first and the second parameter are stored in the message body and the attachment of the output message, respectively. Accordingly, this more advanced embodiment of the method of the invention allows to use a message, such as an email message with a MIME attachment, not only for adding a new data element to the relational database but also to retrieve one or more data elements, which can be n sent to a recipient as a message having possibly one or more attachments According to a further aspect, one embodiment of the present invention is directed to a system for transferring data from a message, in particular a MIME attachment, to a relational database, the system comprising a XML sequence, which determines, how the data is to be processed, an executable sequencer, adapted to process the message based on the XML sequence, wherein the sequencer is further adapted to execute at least one SQL statement for accessing the database, while processing the message. This system allows to perform any of the above described methods.

Further dependent claims relate to preferred embodiments of the invention.

4. SHORT DESCRIPTION OF THE DRAWINGS

Figure 1B:
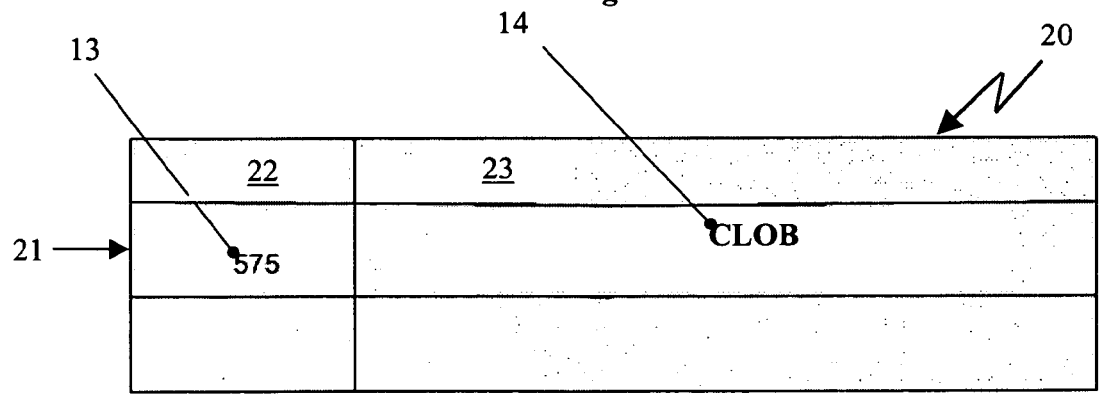
Figure 2:
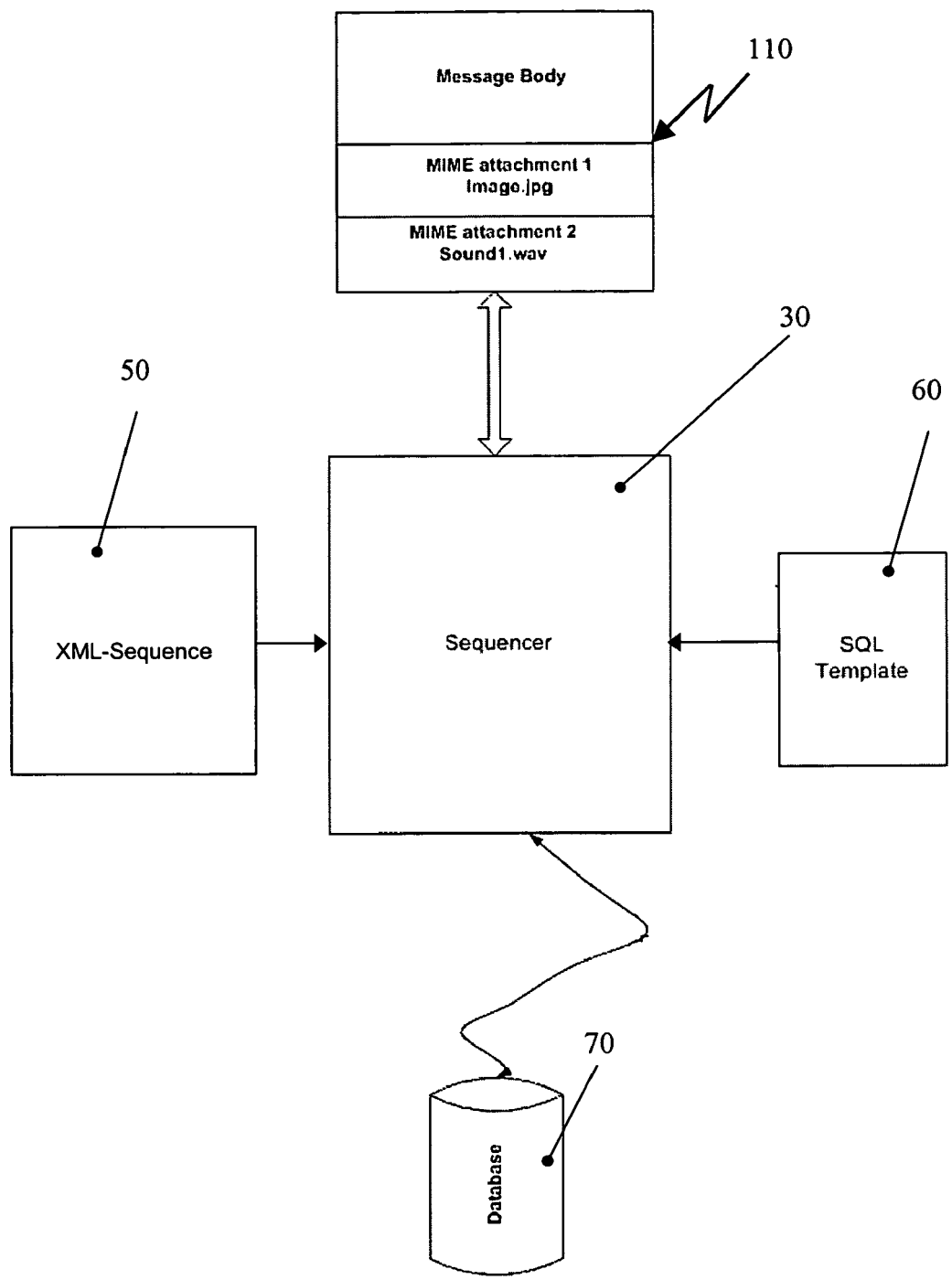

In the following detailed description presently preferred embodiments of the invention are described with reference to the drawings which show:

FIG. 1a-b: An example of a message and a corresponding table in a relational database;

FIG. 2: A schematic overview of the main elements of the system according to an embodiment of the invention;

FIG. 3: An exemplary sequence of an embodiment of the present invention;

FIG. 4: An exemplary SQL template of an embodiment of the present invention; and FIG. 5: A flowchart illustrating an embodiment of the method of the invention.

5. DETAILED DESCRIPTION OF PREFERRED EMBODIMENTS

In the following, presently preferred embodiments of the method and the system according to the invention are described with reference to the processing of an email with a MIME attachment. However, it is to be understood that the present invention can in principle also be used for other types of messages such as SOAP or Java Message Service messages and other types of attachments. Further, the described method and system also allow to process messages without any attachments at all.

FIG. 1a schematically presents an email 10 with data to be inserted into a relational database. The email 10 comprises a message body 11 and a MIME attachment 12. In the example, the message body 11 contains a brief XML statement with data 13 and the attachment 12 contains data 14 that needs to be inserted into the relational database (not shown in FIG. 1a). In the example of FIG. 1a and the flowchart of FIG. 5 discussed below, the data of the attachment is a text file, which needs to be stored in a database character large object (CLOB) column. Not shown in this example are operations with binary large object columns (BLOB) which are also supported.

FIG. 1b present an example of the intended result of the described method and system, namely a table 20 of a relational database, wherein a new row 21 has been added comprising the data 13 of the message body in the first column 22 and the data 14 of the MIME attachment in the second column 23. However, there are many other ways how the data 13 and/or the data 14 of the email 10 can be inserted into the relational database.

FIG. 2 schematically shows the main elements of the system and the described method: A sequencer 30, which is any kind of executable code, for example a coded and compiled computer program or an applet, servlet etc., receives as an input a message 110, having in this example two attachments, namely an image file 114a and sound file 114b.

The sequencer 30 processes the message 110, which leads to an access of the database 40. In addition to the message 110, the sequencer 30 receives a sequence 50 as an input. The sequence 50, an example of which is shown in FIG. 3 and discussed further below, is preferably an XML file, which defines the processing steps to be performed by the sequencer 30. In addition to the sequence 50, the sequences may load one or more SQL templates 60, as schematically shown in FIG. 3. The actual accesses of the database 40 are performed using SQL statements, which can be either directly included into the sequence 50 or result from loading the SQL template 60, which then provides one or more SQL statements.

The double headed arrows in FIG. 2 reflect that the overall process may also be reversed, i.e. data is retrieved from the database 40 and processed by the sequencer 30 to generate a message 110, again under the control of the XML sequence 50 or another sequence (not shown).

Figure 5:
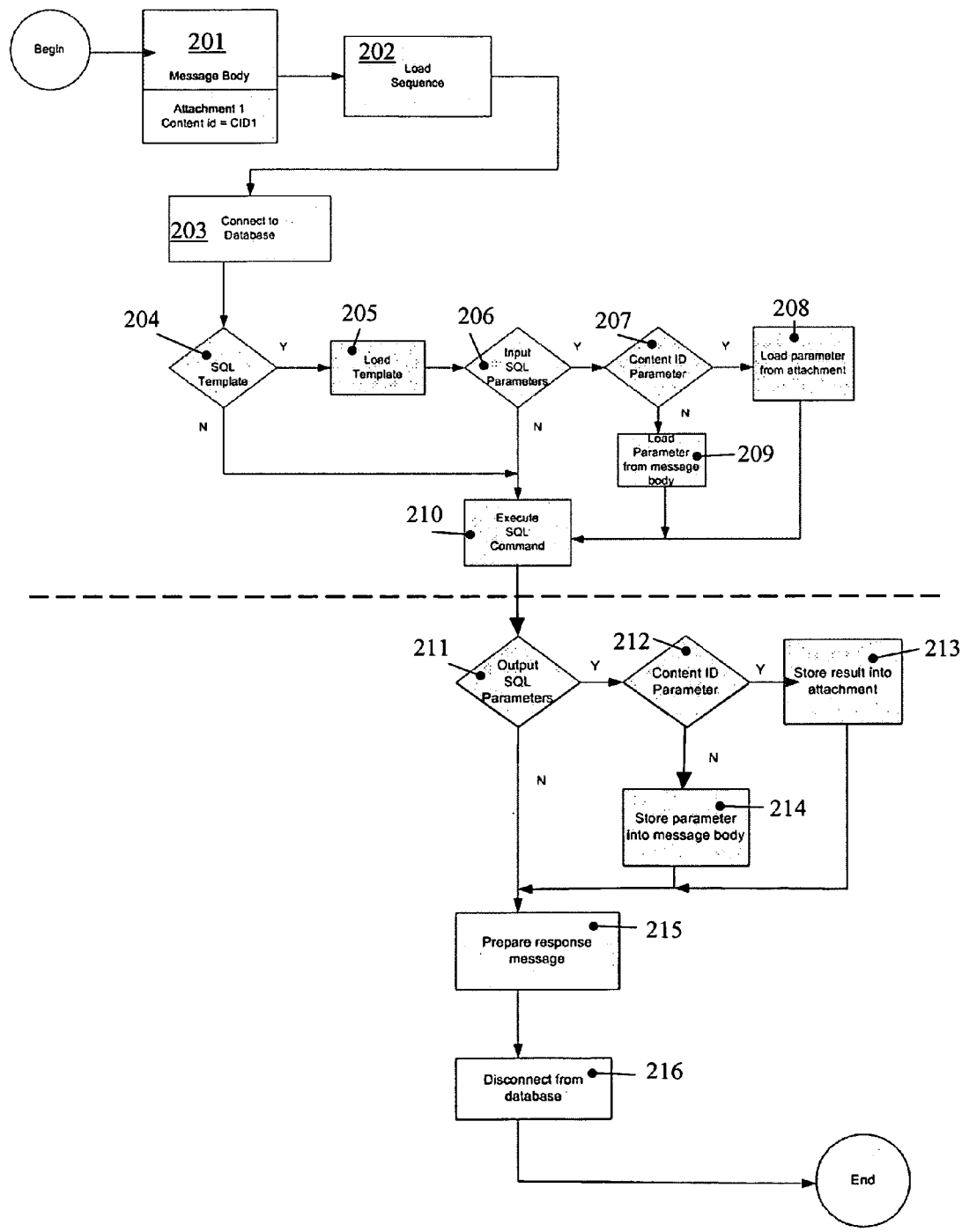

FIG. 5 presents a detailed flowchart of the processing performed by the sequencer 30 in an embodiment of the present invention. As can be seen, the initial step 201 and 202 are the loading of the message and the sequence. The sequence 50, an example of which is shown in FIG. 3, contains a first group 51 of XML statements serving to connect to a database in step 203 (cf. FIG. 5). This may for example be achieved by indicating a suitable URL and calling a corresponding XML-template file such as the "SampleConnectiontemplate.xml" mentioned in the last but one statement of group 51 (cf. FIG. 3).

In a next step 204 a decision is made whether to load a SQL template 60 or not. As mentioned above, using an SQL template is required if the SQL statement has parameters. The group of XML statements 52 shown in FIG. 3 serves for loading the template "Ex_05_ClobTemplate.xml" in step 205, which upon execution inserts a new row in the database 40 (cf FIG. 1b).

An exemplary SQL template is shown in FIG. 4. As can be seen, this template inserts a row into a database and comprises two parameters. The first parameter is defined in the group 61 of XML statements of the exemplary SQL template 60, whereas the second parameter is defined in the group 62 of the SQL template 60. In the example of FIG. 4 the first parameter is used to populate the first column 22 of the database table 20 (cf. FIG. 1B). The second parameter is used to populate the second column 23 of the database table 20 (cf. FIG. 1b). The second parameter contains an element called <cid> which identifies the name and the content type of the message attachment which contains the parameter data. In this example, the message attachment name is NewDoc and the message content type is application text. The content type is specified using a standard MIME content type.

Once the SQL template 60 has been loaded in step 205 (cf. FIG. 5), the values of the parameters are obtained in steps 207-209 based on the processed message. For example, the first parameter receives the value "575" if the message 10 from FIG. 1 is processed and the second parameter receives the content 14 in the MIME attachment 12 of the message 10.

The steps 207-209 show that the described method can also be used for extracting parameters from the message body or the attachment of the message, if desired.

Once the parameter values have been inserted, the fully defined SQL statement is executed (step 210), which leads to the result shown in FIG. 1b. As mentioned above, the new row 21 has been inserted into the table 20 of the database with the value of the first parameter being in the first column 21 and the message attachment content (which is a large text document in this example) being in the second column 22, wherein this content was originally contained in the attachment 12 of the incoming message 10.

The fully defined SQL statement is then executed by the sequencer using suitable JDBC (Java Database Connectivity) calls.

The further steps 211-215 below the dashed line in the flowchart of FIG. 5 reflect return values which might be received as a result of the execution of the SQL statement in step 210. An incoming message might for example be processed by the sequencer 30 such that data is retrieved from the database, or (as shown by the full flowchart of FIG. 5), one set of data is entered into the database and another set of data is returned.

If return data are found in step 211, the steps 212-214 are performed to identify, whether the return data are to be included in the messages body and/or the attachment of an outgoing message. ContentID parameters are preferably included in the attachment (cf. steps 212 and 213), whereas other parameters are preferably included in the message body (cf. step 214). The outgoing message is prepared in step 215.

Step 217 shows that the sequencer 30 finally disconnects from the database. Corresponding XML statements can again be found in the sequence 50 of FIG. 3, wherein the group 53 comprises the instructions for closing the connection to the database.

It is apparent from the above description that the processing flow shown in FIG. 5 is fully controlled by the XML statements in the sequence 50. Accordingly, any modification of this file will affect the processing of the incoming message by the described system. However, no low-level coding nor any re-compilation will be needed to provide a different set of commands to be executed. Adapting the sequence 50 is particularly easy, if a plurality of predefined SQL templates 60 are available, which only need to be used in a meaningful manner to provide the desired sequence of processing steps.

The invention claimed is:

1. A computer-implemented method for the transfer of data contained in an electronic message, in particular a MIME attachment, to a relational database comprising:
   utilizing a computer to perform:
   a. providing a plurality of predefined SQL templates, wherein each predefined SQL template comprises a SQL statement and at least one parameter;
   b. providing an XML sequence, which determines how the data is to be processed, wherein the XML sequence is an XML file comprising at least one XML statement corresponding to at least one of the plurality of predefined SQL templates;
   c. executing a sequencer, which is a computer program comprising executable code, wherein said executing the sequencer comprises the steps of loading the message, loading the XML sequence, and executing the XML sequence, wherein said executing the XML sequence by the sequencer comprises:
      loading the at least one predefined SQL template;
      using the data derived from the message as parameter values of the SQL template to provide at least one executable SQL statement; and
      executing the at least one SQL statement for accessing the relational database.

2. The method of claim 1, wherein the execution of the at least one SQL statement provides output data, and wherein the output data are stored as data in an output message.

3. The method of claim 1, wherein the output data comprise a first and a second parameter, wherein the value of the first and the second parameter are stored in the message body and the attachment of the output message, respectively.

4. A non-transitory computer accessible memory medium storing program instructions for transferring data from a message, in particular a MIME attachment, to a relational database, wherein the program instructions are executable to implement:
   a. a plurality of predefined SQL templates, wherein each predefined SQL template comprises a SQL statement and at least one parameter;
   b. an XML sequence, which determines how the data is to be processed, wherein the XML sequence is an XML file comprising at least one XML statement corresponding to at least one of the plurality of predefined SQL templates;
   c. a sequencer, which is a computer program comprising executable code adapted to load the message, to load the XML sequence, and to execute the XML sequence, wherein, when executing the XML sequence, the sequencer is further adapted to;
      load the at least one predefined SQL template;
      use the data derived from the message as parameter values of the SQL template to provide at least one executable SQL statement; and
      execute the at least one SQL statement for accessing the database.

5. The non-transitory computer accessible memory medium of claim 4, wherein the sequencer is further adapted to store data provided by the execution of the at least one SQL statement as output data in an output message.

6. The non-transitory computer accessible memory medium of claim 5, wherein the output data comprise a first and a second parameter, and wherein the sequencer is further adapted to store the value of the first and second parameter in the message body and the attachment of the output message, respectively.

* * * * *